(12) United States Patent
Li

(10) Patent No.: US 8,720,228 B2
(45) Date of Patent: May 13, 2014

(54) METHODS OF SEPARATING STRENGTHENED GLASS SUBSTRATES

(75) Inventor: Xinghua Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 40 days.

(21) Appl. No.: 13/217,718

(22) Filed: Aug. 25, 2011

(65) Prior Publication Data

US 2012/0047956 A1    Mar. 1, 2012

Related U.S. Application Data

(60) Provisional application No. 61/378,536, filed on Aug. 31, 2010.

(51) Int. Cl.
*C03B 33/037* (2006.01)
*C03B 33/09* (2006.01)
*B23K 26/38* (2006.01)

(52) U.S. Cl.
USPC ............. 65/97; 65/70; 65/56; 219/121.72

(58) Field of Classification Search
USPC ............. 65/56, 70, 97, 105, 112, 174–177; 219/131.6, 121.67
See application file for complete search history.

(56) References Cited

U.S. PATENT DOCUMENTS

| | | | |
|---|---|---|---|
| 2,959,507 A | | 11/1960 | Long |
| 3,453,097 A | * | 7/1969 | Hafner ............................ 65/112 |
| 3,543,979 A | | 12/1970 | Grove et al. |
| 3,629,545 A | | 12/1971 | Graham et al. |
| 3,629,546 A | | 12/1971 | Fry |
| 3,751,238 A | * | 8/1973 | Grego et al. ................ 65/30.14 |
| 4,403,134 A | * | 9/1983 | Klingel .................... 219/121.67 |
| 4,467,168 A | * | 8/1984 | Morgan et al. .......... 219/121.67 |
| 4,468,534 A | | 8/1984 | Boddicker |

(Continued)

FOREIGN PATENT DOCUMENTS

| | | |
|---|---|---|
| EP | 1341730 B1 | 8/2005 |
| GB | 1222182 A | 2/1971 |

(Continued)

OTHER PUBLICATIONS

PCT/US2011/049637 Search Report.

(Continued)

*Primary Examiner* — Jodi C Franklin
(74) *Attorney, Agent, or Firm* — Timothy M. Schaeberle; John T. Haran

(57) ABSTRACT

Methods of separating a strengthened glass substrate having a compressive surface layer and an inner tension layer include translating a laser beam on a surface of the strengthened glass substrate along a line of desired separation from a first edge of the strengthened glass substrate toward a second edge of the strengthened glass substrate. Methods further include backward-propagating a controlled full-body crack within the strengthened glass substrate from the second edge toward the first edge substantially along the line of desired separation. A scribe line may be formed on a surface of the strengthened glass substrate such that the strengthened glass substrate self-separates along the scribe line. A residual stress field may be created within the strengthened glass substrate such that a full-body crack backward-propagates from an exit defect located at the second edge toward the first edge along a line of desired separation, thereby separating the strengthened glass substrate.

9 Claims, 4 Drawing Sheets

(56) References Cited

U.S. PATENT DOCUMENTS

| | | | |
|---|---|---|---|
| 4,639,572 A | 1/1987 | Gruzman et al. | |
| 4,702,042 A | 10/1987 | Herrington et al. | |
| 5,084,604 A * | 1/1992 | Dekker et al. | 219/121.72 |
| 5,132,505 A | 7/1992 | Zonneveld et al. | |
| 5,609,284 A * | 3/1997 | Kondratenko | 225/1 |
| 5,776,220 A * | 7/1998 | Allaire et al. | 65/112 |
| 5,783,289 A * | 7/1998 | Suzuki et al. | 428/195.1 |
| 5,826,772 A * | 10/1998 | Ariglio et al. | 225/2 |
| 5,961,852 A | 10/1999 | Rafla-Yuan et al. | |
| 5,984,159 A | 11/1999 | Ostendarp et al. | |
| 6,023,039 A * | 2/2000 | Sawada | 219/121.61 |
| 6,112,967 A * | 9/2000 | Ostendarp et al. | 225/93.5 |
| 6,211,488 B1 * | 4/2001 | Hoekstra et al. | 219/121.72 |
| 6,222,604 B1 | 4/2001 | Suginoya et al. | |
| 6,252,197 B1 * | 6/2001 | Hoekstra et al. | 219/121.84 |
| 6,259,058 B1 | 7/2001 | Hoekstra | |
| 6,327,875 B1 * | 12/2001 | Allaire et al. | 65/103 |
| 6,420,678 B1 * | 7/2002 | Hoekstra | 219/121.75 |
| 6,423,930 B1 * | 7/2002 | Matsumoto | 219/121.69 |
| 6,489,588 B1 | 12/2002 | Hoekstra et al. | |
| 6,590,181 B2 * | 7/2003 | Choo et al. | 219/121.68 |
| 6,676,878 B2 | 1/2004 | O'Brien et al. | |
| 6,684,885 B2 | 2/2004 | Graczyk | |
| 6,723,952 B2 * | 4/2004 | Choo | 219/121.72 |
| 6,734,391 B2 | 5/2004 | Jeon | |
| 6,744,009 B1 | 6/2004 | Xuan et al. | |
| 6,787,732 B1 * | 9/2004 | Xuan et al. | 219/121.67 |
| 6,800,831 B1 * | 10/2004 | Hoetzel | 219/121.72 |
| 6,811,069 B2 * | 11/2004 | Hauer et al. | 225/93.5 |
| 6,870,129 B2 * | 3/2005 | Hauer et al. | 219/121.72 |
| 6,894,249 B1 | 5/2005 | Hauer et al. | |
| 6,919,530 B2 | 7/2005 | Borgeson et al. | |
| 6,992,026 B2 | 1/2006 | Fukuyo et al. | |
| 7,014,082 B2 * | 3/2006 | Hauer et al. | 225/93.5 |
| 7,211,526 B2 * | 5/2007 | Iri et al. | 438/797 |
| 7,217,448 B2 | 5/2007 | Koyo et al. | |
| 7,304,265 B2 * | 12/2007 | Otsu et al. | 219/121.62 |
| 7,371,431 B2 * | 5/2008 | Dietz et al. | 427/289 |
| 7,396,742 B2 | 7/2008 | Fukuyo et al. | |
| 7,528,342 B2 | 5/2009 | Deshi | |
| 7,626,137 B2 * | 12/2009 | Fukuyo et al. | 219/121.69 |
| 7,628,303 B2 * | 12/2009 | Hoetzel | 225/5 |
| 7,629,250 B2 | 12/2009 | Benson et al. | |
| 7,638,730 B2 * | 12/2009 | Yoo et al. | 219/121.68 |
| 7,642,483 B2 * | 1/2010 | You et al. | 219/121.68 |
| 7,723,212 B2 * | 5/2010 | Yamamoto et al. | 438/463 |
| 7,723,641 B2 * | 5/2010 | Fujii | 219/121.68 |
| 7,726,532 B2 | 6/2010 | Gonoe | |
| 7,772,522 B2 | 8/2010 | Matsumoto et al. | |
| 7,812,281 B2 * | 10/2010 | Acker et al. | 219/121.69 |
| 7,816,623 B2 * | 10/2010 | Otsu et al. | 219/121.62 |
| 7,820,941 B2 * | 10/2010 | Brown et al. | 219/121.69 |
| 7,977,602 B2 | 7/2011 | Birrell | |
| 8,011,207 B2 * | 9/2011 | Abramov et al. | 65/112 |
| 8,051,679 B2 * | 11/2011 | Abramov et al. | 65/112 |
| 8,053,704 B2 * | 11/2011 | Abramov et al. | 219/121.68 |
| 8,067,713 B2 * | 11/2011 | Yue | 219/121.68 |
| 8,071,960 B2 * | 12/2011 | Hoeche | 250/440.11 |
| 8,110,776 B2 | 2/2012 | Jung et al. | |
| RE43,400 E | 5/2012 | O'Brien et al. | |
| 8,171,753 B2 * | 5/2012 | Abramov et al. | 65/176 |
| 8,173,038 B2 | 5/2012 | Wagner | |
| 8,269,138 B2 * | 9/2012 | Garner et al. | 219/121.69 |
| 8,426,767 B2 | 4/2013 | Glaesemann et al. | |
| 8,551,865 B2 | 10/2013 | Fukuyo et al. | |
| 2002/0006765 A1 | 1/2002 | Michel et al. | |
| 2003/0217568 A1 | 11/2003 | Koyo et al. | |
| 2004/0060416 A1 | 4/2004 | Luiz | |
| 2004/0086688 A1 | 5/2004 | Hirano et al. | |
| 2004/0144231 A1 * | 7/2004 | Hanada | 83/880 |
| 2004/0169023 A1 | 9/2004 | Tanaka | |
| 2004/0251290 A1 | 12/2004 | Kondratenko | |
| 2005/0029321 A1 | 2/2005 | Hauer et al. | |
| 2005/0199592 A1 * | 9/2005 | Iri et al. | 219/121.6 |
| 2005/0221044 A1 | 10/2005 | Gaume et al. | |
| 2006/0021977 A1 | 2/2006 | Menegus | |
| 2006/0081101 A1 | 4/2006 | Hayashi et al. | |
| 2006/0081571 A1 * | 4/2006 | Hoebel et al. | 219/121.64 |
| 2006/0101858 A1 * | 5/2006 | Fujii | 65/29.18 |
| 2006/0137505 A1 * | 6/2006 | Wakayama | 83/880 |
| 2007/0039932 A1 | 2/2007 | Haase et al. | |
| 2007/0051706 A1 * | 3/2007 | Bovatsek et al. | 219/121.69 |
| 2007/0062921 A1 * | 3/2007 | Karube et al. | 219/121.72 |
| 2007/0151962 A1 * | 7/2007 | Doll et al. | 219/121.72 |
| 2007/0164072 A1 * | 7/2007 | Nishio | 225/93.5 |
| 2007/0170162 A1 | 7/2007 | Haupt et al. | |
| 2007/0178672 A1 * | 8/2007 | Tanaka et al. | 438/487 |
| 2007/0228100 A1 | 10/2007 | Gonoe | |
| 2008/0000884 A1 | 1/2008 | Sugiura et al. | |
| 2008/0053972 A1 * | 3/2008 | Otsu et al. | 219/121.62 |
| 2008/0110952 A1 * | 5/2008 | Kemmerer et al. | 225/2 |
| 2008/0128953 A1 | 6/2008 | Nagai et al. | |
| 2008/0194079 A1 * | 8/2008 | Yamamoto et al. | 438/462 |
| 2008/0292844 A1 | 11/2008 | Sabia et al. | |
| 2008/0305615 A1 | 12/2008 | Ueno et al. | |
| 2009/0014492 A1 | 1/2009 | Haase | |
| 2009/0040640 A1 | 2/2009 | Kim et al. | |
| 2009/0126403 A1 * | 5/2009 | Abramov et al. | 65/29.18 |
| 2009/0159580 A1 | 6/2009 | Hsu et al. | |
| 2009/0220761 A1 * | 9/2009 | Dejneka et al. | 428/220 |
| 2009/0294419 A1 * | 12/2009 | Abramov et al. | 219/121.68 |
| 2009/0294420 A1 | 12/2009 | Abramov et al. | |
| 2010/0012633 A1 | 1/2010 | Atsumi et al. | |
| 2010/0078417 A1 * | 4/2010 | Abramov et al. | 219/121.72 |
| 2010/0089882 A1 | 4/2010 | Tamura | |
| 2010/0119846 A1 | 5/2010 | Sawada | |
| 2010/0206008 A1 | 8/2010 | Harvey et al. | |
| 2010/0210442 A1 | 8/2010 | Abramov et al. | |
| 2010/0212361 A1 | 8/2010 | Abramov et al. | |
| 2010/0258993 A1 * | 10/2010 | Zhou et al. | 269/20 |
| 2010/0287991 A1 * | 11/2010 | Brown et al. | 65/114 |
| 2010/0294748 A1 * | 11/2010 | Garner et al. | 219/121.72 |
| 2011/0000897 A1 | 1/2011 | Nakano et al. | |
| 2011/0000898 A1 | 1/2011 | Rumsby | |
| 2011/0027971 A1 | 2/2011 | Fukuyo et al. | |
| 2011/0037149 A1 | 2/2011 | Fukuyo et al. | |
| 2011/0049765 A1 | 3/2011 | Li et al. | |
| 2011/0095062 A1 * | 4/2011 | Maekawa | 225/2 |
| 2011/0127244 A1 | 6/2011 | Li et al. | |
| 2011/0250423 A1 * | 10/2011 | Fukasawa et al. | 428/220 |
| 2012/0135847 A1 * | 5/2012 | Fukasawa et al. | 501/11 |
| 2013/0323469 A1 | 12/2013 | Abramov et al. | |

FOREIGN PATENT DOCUMENTS

| | | | |
|---|---|---|---|
| JP | 2000219528 A | 8/2000 | |
| JP | 2001080928 A | 3/2001 | |
| JP | 2004010466 A | 1/2004 | |
| JP | 2004083378 A | 3/2004 | |
| JP | 2004352535 A | 12/2004 | |
| JP | 2005212473 A | 8/2005 | |
| JP | 2006159747 A | 6/2006 | |
| JP | 2008007360 A | 1/2008 | |
| JP | 2008007384 A | 1/2008 | |
| JP | 2009066851 A | 4/2009 | |
| JP | 2009280452 A | 12/2009 | |
| JP | 2010150068 A | 7/2010 | |
| WO | 02100620 A1 | 12/2002 | |
| WO | 03008352 A1 | 1/2003 | |
| WO | 2004014625 A1 | 2/2004 | |
| WO | 2007094348 A1 | 8/2007 | |
| WO | WO 2008140818 A2 * | 11/2008 | B23K 26/40 |
| WO | WO 2010108061 A2 * | 9/2010 | |
| WO | WO 2010138451 A2 * | 12/2010 | |

OTHER PUBLICATIONS

Karube, et al. "Laser-Induced Cleavage of LCD Glass as Full-Body Cutting"; Proceeding of SPIE, vol. 6880; pp. 688007-1 to 688007-10; 2008.

Yamamoto et al. "Three-Dimensional Thermal Stress Analysis on Laser Scribing of Glass"; Precision Engineering, 32 (2008) 301-308.

(56) References Cited

OTHER PUBLICATIONS

Yamamoto et al. "Thermal Stress Analysis on Laser Scribing of Glass", Journal of Laser Applications; vol. 20, No. 4, (2008), pp. 193-200.

Hamamatsu Photonics K.K. Electron Tube Division; "Stealth Dicing Technology and Applications", Mar. 2005.

Kumagai, Masayoshi, et al. "Advanced Dicing Technology for Semiconductor Wafer—Stealth Dicing." Semiconductor Manufacturing, IEEE Transactions on 20.3 (2007): 259-265.

International Search Report relating to PCT/US2010/047238 filed Aug. 31, 2010; Mail Date: Nov. 30, 2010.

International Search Report relating to PCT/US2010/057932 filed Nov. 24, 2010; Mail Date: Mar. 15, 2011.

International Search Report relating to PCT/US2011/049637 filed Nov. 22, 2011; Mail Date: May 12, 2011.

International Search Report & Written Opinion relating to PCT/US2013/044208 filed Jun. 5, 2013; Mail Date: Sep. 18, 2013.

International Search Report relating to PCT/US2010/046885 filed Aug. 27, 2010; Mail Date: Nov. 29, 2010.

Non-Final Office Action dated Nov. 26, 2013, relating to U.S. Appl. No. 12/952,935, filed Nov. 23, 2010.

* cited by examiner

METHODS OF SEPARATING STRENGTHENED GLASS SUBSTRATES

CROSS-REFERENCE TO RELATED APPLICATIONS

This application claims the benefit of priority under 35 U.S.C. §119 of U.S. Provisional Application Ser. No. 61/378,536 filed on Aug. 31, 2010 the content of which is relied upon and incorporated herein by reference in its entirety.

BACKGROUND

1. Field

The present specification generally relates to methods for separating strengthened glass substrates and, more particularly, to methods for laser-separating strengthened glass substrates without the application of a mechanical force.

2. Technical Background

Thin glass substrates have a variety of applications in consumer electronic devices, as well as other fields. For example, glass substrates may be used as cover sheets for LCD and LED displays incorporated in mobile telephones, display devices such as televisions and computer monitors, and various other electronic devices. Cover sheets used in such devices may be formed by sectioning or separating a large glass substrate into a plurality of smaller glass substrates using various laser cutting techniques. For example, glass substrates may be separated by scribe-and-break techniques. However, when the scribe-and-break techniques are utilized to separate strengthened glass substrates such as ion-exchanged glass, uncontrollable full-body separation rather than the formation of a scribe line may occur. The uncontrolled separation generally leads to poor edge characteristics compared to the scribe-and-break process.

Moreover, the reliability of such scribe-and-break processes is further compromised as the dimensions of the large mother strengthened glass substrate sheet increase because it may be difficult to precisely apply the needed mechanical force to break the sheets along the scribe line. Large sheets of strengthened glass substrates may be prone to shattering and/or the formation of uncontrolled cracks during both handling and the breaking process.

Accordingly, a need exists for alternative methods for separating strengthened glass substrates.

SUMMARY

In one embodiment, a method of separating a strengthened glass substrate having a compressive surface layer and an inner tension layer includes translating a laser beam on a surface of the strengthened glass substrate along a line of desired separation from a first edge of the strengthened glass substrate toward a second edge of the strengthened glass substrate. The method further includes backward-propagating a controlled full-body crack within the strengthened glass substrate from the second edge toward the first edge substantially along the line of desired separation.

In another embodiment, a method of self-separating a strengthened glass substrate having a compressive surface layer and an inner tension layer into two or more glass articles includes forming an initiation defect through the compressive surface layer to partially expose the inner tension layer. The initiation defect is offset from a first edge of the strengthened glass substrate and is perpendicular to a line of desired separation. The method further includes applying a laser shield to a shielded region of the strengthened glass substrate located between the first edge and the initiation defect, and generating a scribe line along the line of desired separation through the compressive surface layer by translating a laser beam and a cooling jet on a surface of the strengthened glass substrate from the first edge toward a second edge of the strengthened glass substrate. The scribe line is defined by a laser vent, and the laser shield prevents the laser beam from being incident on the surface of the strengthened glass substrate in the shielded region. A full-body crack is propagated from the second edge toward the initiation defect along the scribe line as the laser beam traverses the second edge of the strengthened glass substrate, wherein the laser beam and cooling jet are operated such that a depth of the laser vent proximate the second edge is sufficient to generate the full-body crack at the second edge.

In yet another embodiment, a method of generating a full-body crack to separate a strengthened glass substrate having a compressive surface layer and an inner tension layer into two or more glass articles includes forming an exit defect through the compressive surface layer to partially expose the inner tension layer. The exit defect is located at a second edge of the strengthened glass substrate. The method further includes translating a laser beam on a surface of the strengthened glass substrate from a first edge of the strengthened glass substrate toward the second edge of the strengthened glass substrate along a line of desired separation, thereby producing a residual stress field within the strengthened glass substrate along the line of desired separation. A full-body crack is propagated from the second edge toward the first edge substantially along the line of desired separation as the laser beam is incident on the exit defect.

Additional features and advantages of the methods will be set forth in the detailed description which follows, and in part will be readily apparent to those skilled in the art from that description or recognized by practicing the embodiments described herein, including the detailed description which follows the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description, serve to explain the principles and operations of the claimed subject matter.

DETAILED DESCRIPTION OF THE PREFERRED EMBODIMENTS

Figure 1:
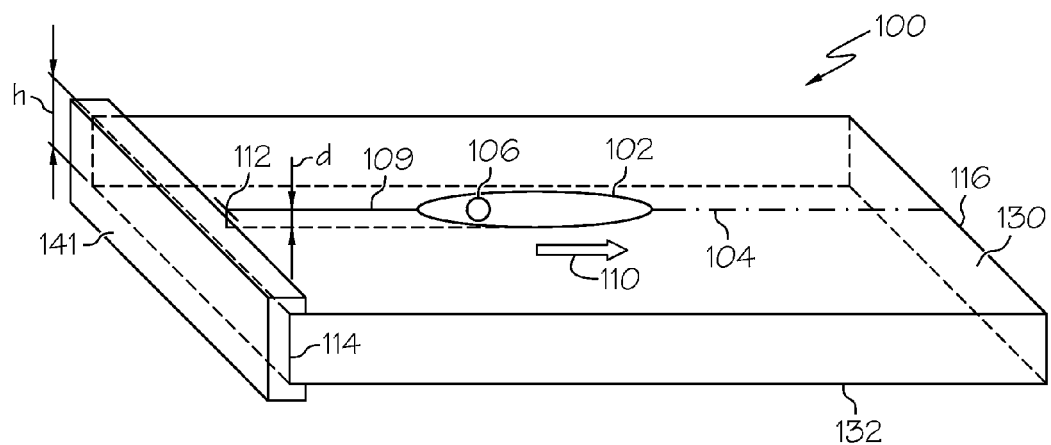
FIG. 1 schematically depicts a perspective view of an off-edge defect, a laser shield, an elliptical beam spot of a laser beam, and a cooling spot of a cooling jet incident on a strengthened glass substrate according to at least one embodiment shown and described herein.

Reference will now be made in detail to various embodiments of methods for separating sheets of strengthened glass substrates, examples of which are illustrated in the accompanying drawings. Whenever possible, the same reference numerals will be used throughout the drawings to refer to the same or like parts. As described herein, methods for separating strengthened glass substrates generally comprise weakening the strengthened glass substrate along a line of desired separation and then backward-propagating a full-body crack long the weakened line of desired separation. A laser beam may be translated on a surface of the strengthened glass substrate from a first edge to a second edge along the line of desired separation to create the weakened area. The translation of the laser beam with respect to the strengthened glass substrate may form an initial scribe line within the glass substrate, or create a stress field, along the line of desired separation. The full-body crack is then backward-propagated from the second edge to the first edge along the line of desired separation as the laser beam traverses the second edge by following the path of least resistance. The full-body crack will propagate along the initial scribe line or the stress field created by the laser beam. Embodiments may utilize a laser shield, off-edge initiation defects, and/or exit edge defects to generate the full-body crack. Various embodiments for separating strengthened glass substrates will be described in more detail herein.

Referring initially to FIGS. 1-5B, one embodiment of a system and method for separating a strengthened glass substrate 100 is schematically depicted. Generally, the method illustrated by FIGS. 1-5B may be described as a self-separation method of separating a strengthened glass substrate. It is common to separate various substrates by a scribe-and-break technique, where a shallow scribe line is first formed on a surface of the substrate and then a mechanical force is applied to break the substrate into one or more pieces. The method described with reference to FIGS. 1-5B is referred to as a self-separation scribe-and-break technique, because no mechanical force is required to separate the strengthened glass substrate because the strengthened glass substrate separates upon completion (or nearly upon completion) of forming the scribe line (i.e., the strengthened glass substrate self-separates).

The strengthened glass substrate 100 has a first surface 130, a second surface 132, edges (e.g., first edge 114 and second edge 116) and a thickness h. It should be understood that the strengthened glass substrate may have other shapes, such as circular, for example. It should also be understood that the thickness h of the strengthened glass substrate 100 as illustrated in the figures is exaggerated for ease of illustration. The strengthened glass substrate 100 may be chemically strengthened by an ion-exchange process to produce compressive surface layers 111 and an inner tension layer 115 within the strengthened glass substrate. The strengthened glass substrate may be formed from various glass compositions including, without limitation, borosilicate glasses or aluminosilicate glasses. The strengthened glass substrate 100 may be a large sheet that may be separated into smaller pieces to fabricate small strengthened glass articles such as glass cover sheet touch panels for consumer electronics devices, for example.

In a chemical strengthening process, for example, a glass substrate may be subjected to an ion exchange strengthening process that comprises submersing a glass substrate 100 in a molten salt bath of $KNO_3$ for a length of time (e.g., eight hours). The ion exchange strengthening process may result in a strengthened glass substrate 100 having increased compressive stress forces in two deepened compressive surface layers 111 and increased tension stress forces in an inner tension layer 115.

Figure 2:
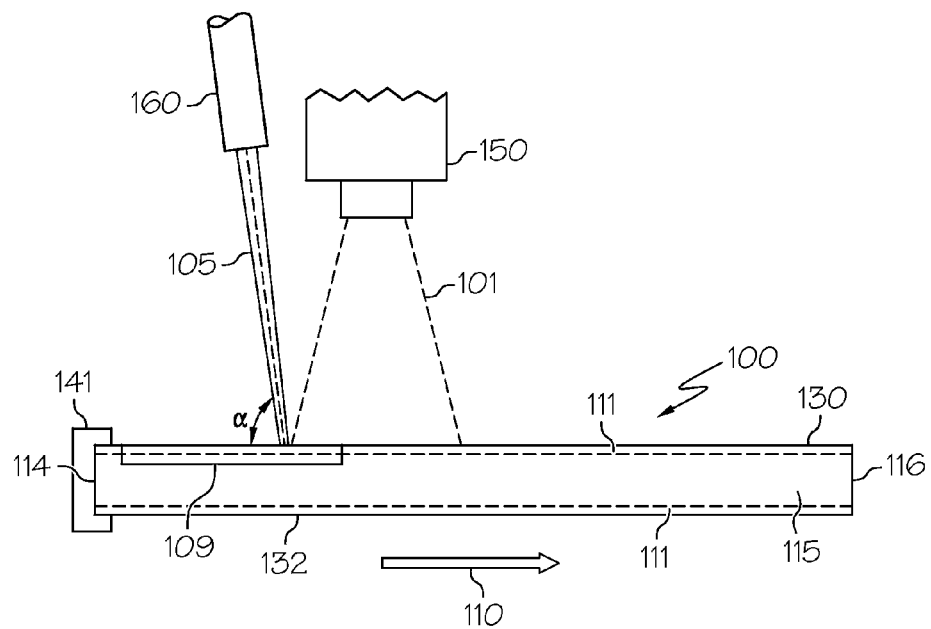
FIG. 2 schematically depicts a cross section of the laser beam, laser shield, cooling jet, and strengthened glass substrate of FIG. 1 according to at least one embodiment shown and described herein.

The system illustrated in FIGS. 1-5B generally comprises a laser shield applied to the first edge 114 of the strengthened glass substrate 100, a laser source 150 for heating the strengthened glass substrate 100 along a line of desired separation 104, and a nozzle 160 for directing a cooling jet 105 for quenching the heated surface of the strengthened glass substrate 100 along the line of desired separation 104 (FIG. 2). The resulting change in temperature of the strengthened glass substrate due to the application of the beam spot 102 and a cooling spot 106 generated by the cooling jet 105 causes tensile stresses to develop along the line of desired separation 104 in a direction perpendicular to the line of desired separation 104, thereby forming a vent 109 which extends partially through the thickness of the strengthened glass substrate 100. The scribe vent 109 is a mechanical alteration of the strengthened glass substrate structure. The completed scribe vent 109 is positioned along the line of desired separation 104 of which the strengthened glass substrate 100 will be separated. As described in more detail below, the scribe vent 109 is initiated at an initiation defect 112 that is offset from a first edge 114 of the strengthened glass substrate 100 and terminates at a second edge 116 of the strengthened glass substrate 100.

The laser source 150 is operable to emit a beam having a wavelength suitable for imparting thermal energy to the strengthened glass substrate 100 such that the laser energy is strongly absorbed through the glass thickness h, thereby heating the surface of the strengthened glass substrate 100. For example, the laser source 150 generally emits a laser beam 101 having a wavelength in the infrared range. Suitable laser sources include a CO laser with a wavelength from about 5 µm to about 6 µm, an HF laser with a wavelength from about 2.6 µm to about 3.0 µm, or an erbium YAG laser with a wavelength of about 2.9 µm. In the embodiments describe herein, the laser source is a pulsed $CO_2$ laser which produces a beam of infrared light having a wavelength from about 9.4 µm to about 10.6 µm. The $CO_2$ laser source may be an RF-excited laser source operated in a quasi-continuous wave mode. In one embodiment, the laser source 150 is operated to produce an output beam in the $TEM_{00}$ mode such that the laser beam 101 of the laser source 150 has a Gaussian intensity distribution. Alternatively, the laser source may be operated to produce an output beam in the $TEM_{01}$ mode such that the output beam has a "D" or flat mode intensity distribution. The output power of the laser source may be from about 20 watts to greater than 500 watts, depending on the desired scribing speed, the composition of the glass being scribed, and the depth of the compressive surface layer.

In order to avoid overheating the surface of the strengthened glass substrate 100 (which may lead to ablation or vaporization of glass from the surface of the strengthened glass substrate or residual stresses which weaken the cut edge), the beam 101 emitted by the laser source may be shaped with various optical elements (not shown) such that the beam 101 forms an elliptical beam spot 102 on the surface of the strengthened glass substrate 100. For example, in one embodiment, a pair of cylindrical lenses (not shown) is disposed in the path of the laser beam 101 emitted from the laser source 150. Alternatively, the cylindrical lenses and/or other optical elements used for shaping the laser beam to form an elliptical beam spot are integral with the laser source 150. The cylindrical lenses shape the laser beam 101 such that the beam spot incident on the surface of the strengthened glass substrate is generally elliptical in shape, as depicted in FIG. 1. Although beam spots described herein may be elliptical in shape, it should be understood that embodiments are not limited thereto, as the beam spot may have other shapes, including circular, square, rectangular, etc.

Figure 3:
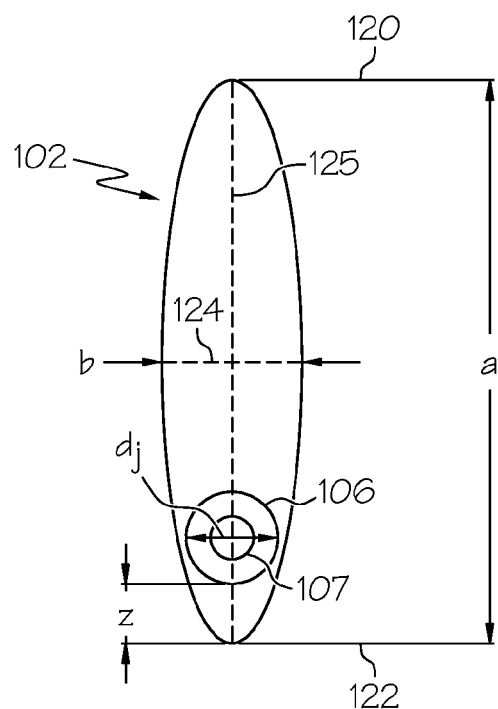
FIG. 3 schematically depicts the relative positioning of the elliptical beam spot and cooling spot according to at least one embodiment shown and described herein.

Referring to FIG. 3, the elliptical beam spot 102 generally has a minor axis 124 of width b and a major axis 125 of length a. The minor axis 124 extends across the midpoint of the elliptical beam spot 102 as shown in FIG. 3. In one embodiment, the width b of the minor axis 124 is greater than or equal to a diameter of the cooling spot 106 formed where the cooling jet contacts a surface of the strengthened glass substrate. For example, if the cooling spot (i.e., the cross section of the cooling jet where the cooling jet is incident on the surface of the strengthened glass substrate) has a diameter of 2 mm, then the width b of the minor axis is at least 2 mm.

The major axis 125 generally has a length a between the leading edge 120 and the trailing edge 122 of the elliptical beam spot 102, as shown in FIG. 3. The length a of the elliptical beam spot 102 may generally control the depth of the laser generated vent. The longer the laser beam spot, the deeper the vent. If the length a is fixed, an increase in scribing speed v produces a shallower vent. Conversely, the slower the scribing speed v, the deeper the vent that is created. For laser scribing strengthened glass substrates, the vent depth should be controlled such that vent growth will be slow enough to complete the laser scribing operation. This means that the length of the laser beam should be fixed in accordance with a desired scribing speed.

Regarding laser power of the laser beam 101, the laser power that may be used to heat the strengthened glass substrate may be limited by the instantaneous and average power density. The instantaneous power density may be defined as the laser power P divided by the area of the beam spot. The average power density $I_{average}$ may be defined as the laser power P divided by the sum of the laser beam spot size and the laser beam transversed area per unit of time:

$$I_{average} = \frac{P}{\pi \cdot a \cdot b \div 4 + b \cdot v}, \cdot \qquad \text{Eq. (1)}$$

The maximum permissible laser power density to heat the strengthened glass substrate without generating stress relaxation depends on the glass properties such as thermal capacity, thermal diffusivity and light absorption at the laser wavelength, glass softening point, etc. If $I_{average}$ is set to equal $I_{max}$, the following is derived:

$$b = \frac{P}{I_{max}} \cdot \frac{1}{\frac{\pi}{4} \cdot a + v}, \cdot \qquad \text{Eq. (2)}$$

Therefore, the width b of the elliptical beam spot may be controlled to achieve the desired average power density as the length a may be fixed to achieve a desired vent depth. More specifically, Eq. (2) illustrates that 1) given a fixed laser power and maximum permissible laser power density, the width b of the of elliptical beam spot should be increased with decreasing laser scribing speed, 2) because the laser scribing speed decreases with an increase of the depth of layer, the laser beam width b should be increased correspondingly, and 3) an increase of the laser power requires an increase of the laser beam width b, provided that the laser scribing speed is kept at a constant speed. With the increasing depth of layer, the amount of glass volume that needs to be heated also increases. Because the power density is limited to a certain value, to increase the laser power, the width b of the elliptical beam spot should be increased.

It is noted that heat loss due to thermal diffusion will also be present during the initial scribing process. Thermal diffusion reduces the local glass temperature from laser heating. Since the heat loss is proportional to the local temperature gradient, to generate the required tensile stress on the propagating vent front, it may be necessary to reduce the temperature gradient at the vent front location prior to and during quenching. This may be achieved by using a wider elliptical beam spot to heat up the volume of the strengthened glass substrate adjacent to the vent front.

Referring to FIGS. 2 and 3, the cooling jet 105 generally comprises a flow of pressurized fluid emitted from a nozzle 160 and directed onto the surface of the strengthened glass substrate 100. The pressurized fluid may comprise a liquid, such as, for example, water, ethanol, liquid nitrogen and/or a chemical coolant. Alternatively, the cooling jet 105 may comprise a compressed gas such as, for example, compressed air, compressed nitrogen, compressed helium or a similar compressed gas. The cooling jet 105 may also comprise a mixture of liquid and compressed gas. In the embodiments described herein the cooling jet is de-ionized water.

The cooling jet 105 is emitted from an orifice (not shown) in the end of the nozzle. The cooling spot 106 formed where the cooling jet 105 is incident on the surface of the strengthened glass substrate has a diameter $d_j$ which is larger than the orifice in the nozzle 160. The nozzle 160 is positioned behind the laser source 150 with respect to the scribing direction 110 (i.e., a cutting axis). In the embodiments described herein, the nozzle 160 is oriented at an angle with respect to the surface 130 of the strengthened glass substrate 100 such that the cooling jet 105 is incident on the surface of the strengthened glass substrate at an angle α which is less than 90 degrees relative to the surface of the strengthened glass substrate 100. In one embodiment, the cooling jet 105 may be translated in coordination with the translating elliptical beam spot 102. In another embodiment, the strengthened glass substrate 100 may be mounted on a translation table capable of translating the strengthened glass substrate 100 under the laser beam 101 and cooling jet 105. The cooling jet 105 may be directed onto the surface 130 of the strengthened glass substrate 100 at an area that is adjacent to the elliptical beam spot.

Referring to FIGS. 1-5B, a method of self-separating a strengthened glass substrate 100 into one or more articles by generating a scribe vent may include first introducing an initiation defect 112 on a first surface 130 of the strengthened glass substrate 100 to form a scribe vent initiation point. The initiation defect 112 is offset from the first edge 114 of the strengthened glass substrate 100 by a defect offset distance $d_{def}$. The initiation defect 112 may be an initiation crack that is formed mechanically or by laser ablation, for example. The offset distance $d_{def}$ may depend on the desired scribing speed, the composition of the glass being scribed, and the depth of the compressive surface layer 111. In one embodiment, the offset distance $d_{def}$ is approximately 6 mm. In other embodiments, the offset distance may be in the range of about 3 mm to about 10 mm. As described in more detail below, a vent originates from the initiation defect 112 and propagates along a relative motion of the laser beam 101 and cooling jet 105.

The initiation defect 112 may be an initiation crack that is perpendicular to a scribing direction and the line of desired separation. The perpendicular orientation of the initiation defect 112 may yield increased mechanical repeatability over an initiation defect that is parallel to the scribing direction. For example, the perpendicular orientation of the initiation defect 112 may prevent uncontrolled full-body vents from forming during the scribing step.

The initiation defect 112 may be mechanically formed by an application of a diamond scriber, although other mechanical devices may be utilized, such as a mechanical scoring wheel, a grinding wheel, a carbide tip, an engraver, etc. Care should be taken when forming the initiation defect 112 to ensure that the defect does not extend too deeply into the inner tension layer 115. Therefore, the mechanical device should not be so sharp and the applied force too great that the resulting defect is too deep into the bulk of the strengthened glass substrate. Deep median cracks generated by the application of a sharp mechanical device may penetrate into the inner tension layer 115 too deeply and cause a full-body crack during the laser scribing process. Defects having many lateral and radial cracks and shallow median cracks that only partially expose the inner tension layer may be achieved by the use of blunt mechanical devices.

As an example and not a limitation, an air actuated cylinder was used to apply a cone-shaped diamond scriber to the surface of a 1.1 mm thick ion-exchanged strengthened glass substrate having a 30 μm, 760 MPa compressive stress layer, and a 21 MPa inner tension layer. The cone-shaped diamond tip had an angle of about 105°. The air-actuated cylinder applied the diamond tip to the surface of the strengthened glass substrate at a force of about 9 N, a scoring speed of about 5 mm/s, and a dragging angle of about 12°. The process yielded a perpendicular initiation defect that partially exposed the inner tension layer. The properties of the diamond tip and scoring process may depend on the properties of the strengthened glass substrate (e.g., the thickness of the glass substrate, the thickness and compressive stress of the compressive stress layer, etc.). A cone-shaped diamond tip having an angle of greater than 90° and an applied force between about 5 N and about 15 N may be utilized depending on the properties of the strengthened glass substrate.

Referring specifically now to FIGS. 1 and 2, a laser shield 141 may be applied to the first edge 114 of the strengthened glass substrate 100 to shield the strengthened glass substrate 100 from the beam 101 in a shielded region that is located on a perimeter of the strengthened glass substrate between the first edge 114 and near the initiation defect 112. The shielded region may extend from the initiation defect 112 to the first edge 114 of the strengthened glass substrate 100. The laser shield 141 may comprise a material capable of preventing laser radiation from entering and heating the strengthened glass substrate 100 in the shielded regions, e.g., a metal material. It should be understood that other laser shield configurations other than the illustrated configuration may be utilized. For example, the laser shield may be configured as a flat metal sheet that is attached to the strengthened glass substrate 100 (e.g., only the top surface of the strengthened glass substrate is shielded at the first edge). As the strengthened glass substrate 100 is translated with respect to the beam spot and cooling spot 106, the laser shield 141 prevents a vent from opening in the shielded region, thereby enabling a scribe vent that extends from the initiation defect 112 toward the second edge 116.

In another embodiment, a thin thermally conductive coating may be deposited on the first edge of the strengthened glass substrate 100 as the laser shield 141 (e.g., between the first edge and the initiation defect 112). For example, the thin thermally conductive coating may be a metal electrode material that is typically used to form contacts on a touch-sensitive screen. The thermally conductive coating may be applied to the strengthened glass substrate 100 using a mask, and may provide the laser shielding effect described above.

Alternatively, rather than applying a laser shield to the strengthened glass substrate 100, the laser source 150 may be operated such that laser beam 101 is turned on only at, and after, the initiation defect 112 such that it is not incident on the surface 130 prior to the initiation defect 112 (i.e., the laser beam is prevented from being incident in the shielded region between the first edge and the initiation defect). In another embodiment, a power of the laser beam 101 may be ramped up starting from the first edge 114 until the initiation defect 112 such that the laser source 150 is operated at full scribing power by the time the beam spot 102 reaches the initiation defect 112.

After the initiation defect 112 is formed and the laser shield 141 is applied to the shielded region of the strengthened glass substrate 110, a beam 101 from the laser source 150 is directed onto the surface of the strengthened glass substrate 100 such that the beam is incident on the line of desired separation 104 at the initiation defect 112, as illustrated in FIGS. 1 and 2. The beam 101 is initially directed onto the substrate such that the initiation defect 112 is positioned within the elliptical beam spot 102 of the beam 101, and the major axis 125 of the elliptical beam spot 102 is substantially collinear with the line of desired separation 104. When the beam 101 of the laser source 150 is positioned on the surface 130 of the strengthened glass substrate 100, the beam 101 imparts radiant thermal energy to the compressive surface layer 111, thereby heating the strengthened glass substrate 100 along the line of desired separation 104. The maximum temperature $T_{max}$ to which the glass surface is heated is generally less than the strain point of the glass $T_g$ so as to avoid stress relaxation during heating and the development of undesirable residual stresses following quenching by the cooling jet. The temperature of the strengthened glass substrate 100 may be controlled by adjusting various parameters including, for example, the power of the laser source and the scribing speed υ with which the beam of the laser is advanced over the surface of the strengthened glass substrate 100 along the line of desired separation 104, as described above. After the beam 101 is initially positioned on the line of desired separation 104, the elliptical beam spot 102 is advanced along the surface 130 of the strengthened glass substrate 100 on the line of desired separation 104 at the scribing speed υ, thereby heating the surface of the strengthened glass substrate along the line of desired separation 104 between the initiation defect 112 and the second edge 116. The elliptical beam spot 102 may be translated over the surface by moving the laser source 150 (and nozzle 160) relative to the strengthened glass substrate 100. Alternatively, the elliptical beam spot 102 may be translated by moving the strengthened glass substrate 100 relative to the laser source 150 and nozzle 160.

Figure 4:
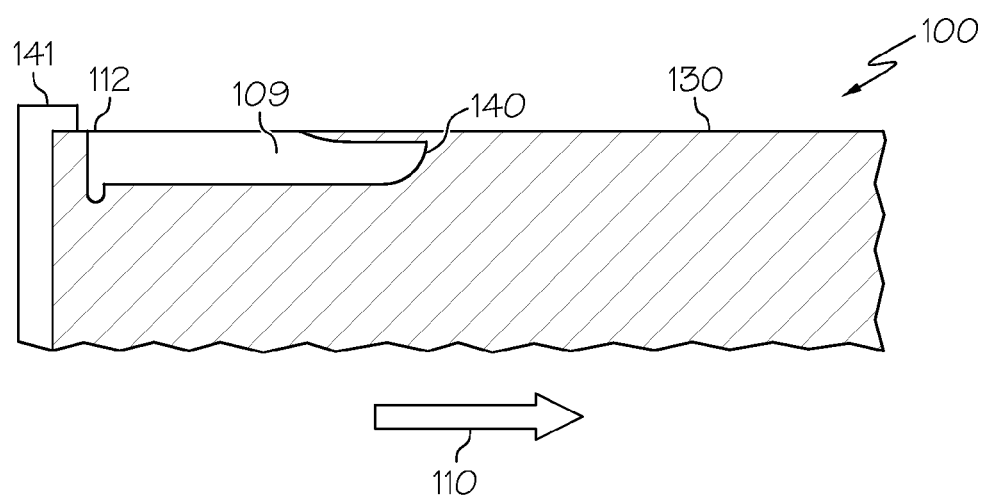
FIG. 4 schematically depicts a cross section of a scribe vent and a vent front according to at least one embodiment shown and described herein.

In order to form a scribe vent 109 in the surface 130 of the strengthened glass substrate, the heated surface of the strengthened glass substrate 100 is cooled or quenched with the cooling jet 105 emitted from the nozzle 160. The change in temperature due to quenching causes tensile stresses to develop in the surface of the strengthened glass substrate in a direction perpendicular to the line of desired separation 104. Referring to FIG. 4, these tensile stresses cause a vent front 140 to propagate under the surface of the strengthened glass substrate 100 in the scribing direction 110 along the line of desired separation 104. In the embodiments described herein, the vent 109 may extend beneath the surface of the substrate to a depth h, which is less than a quarter of the thickness h of the strengthened glass substrate. In one embodiment, the depth d is approximately 15% of the thickness h of the strengthened glass substrate. In order to initiate and propagate the vent 109 along the surface of the strengthened glass substrate 100, a threshold change in temperature $\Delta T_{TH}$ should be exceeded by the heating and subsequent cooling of the surface of the strengthened glass substrate in order to generate tensile stresses sufficient for vent initiation and propagation.

More specifically, heating the strengthened glass substrate 100 with the laser source 150 and quenching the heated surface of the strengthened glass substrate with the cooling jet 105 generates a tensile stress in the surface of the strengthened glass substrate perpendicular to the line of desired separation 104. If the tensile stress exceeds the threshold tensile stress $\sigma_{TH}$ of the material from which the strengthened glass substrate 100 is formed, a preexisting crack or vent 109 can be propagated in the strengthened glass substrate. The laser generated tensile stress due to the heating and cooling cycle may be estimated by:

$$\sigma_{TH} = \frac{1}{2} \alpha \cdot E \cdot \Delta T, \qquad \text{Eq. (3)}$$

where α is the coefficient of thermal expansion, E is the Young's modulus, and ΔT is the temperature drop from the laser beam and cooling jet quenching cycle. Using Eq. (3), the maximum tensile stress that may be generated during the laser heating and cooing jet quenching cycle cannot exceed about 100 to about 200 MPa for any type of glass. This value is significantly less than the surface compression (e.g., >500 MPa) produced through the ion-exchange process. Therefore, the laser scribing process does not generate enough tensile stress to propagate a scribe vent that is totally enclosed in the compressive layer. Rather, the scribing process on strengthened glass substrates is an indirect process.

Referring to FIG. 4, the tensile stresses described above cause a vent front 140 to propagate along the surface 130 of the strengthened glass substrate in the scribing direction 110 on the line of desired separation. As illustrated in FIG. 4, the vent front 140 travels beneath the surface 130 of the strengthened glass substrate 100. Due to the opening of the vent 109 below the glass surface, the surface compression stress is relieved and breakthrough of the vent 109 to the glass surface occurs after the vent front 140 as the vent front propagates within the strengthened glass substrate 100.

As the vent front 140 travels below the surface 130 and within the compressive surface layer 111 (i.e., depth of layer), efficient and sustained quenching may be needed to generate the tensile stress to propagate the scribe vent 109 at or around the compressive surface layer 111. The quenching efficiency may depend on the cooling jet 105 impact speed, the volumetric flow of the cooling jet 105 provided by the nozzle 160, and the temperature gradient of the cooling jet 105 relative to the heated strengthened glass substrate 100. In one embodiment, the temperature of the cooling jet 105 (e.g., water) is cooled to a stable temperature to just above 0° Celsius. The temperature and the flow rate of the cooling jet 105 should remain stable throughout the process to achieve proper scribe vent depth.

Qualitatively, in an ideal system, the characteristic resident cooling time of the cooling jet 105 on the strengthened glass substrate 100 surface is equal to $d_j/v$, where $d_j$ is the diameter of the cooling jet core and v is the scribing speed. The cooling jet core 107 is the central region of the cooling spot 106 where the cooling jet 105 impacts the surface of the strengthened glass substrate. Assuming that the vent front 140 is located at the depth of layer l within the strengthened glass substrate 100, the time needed for the quenching effect to reach a depth of layer value l may be estimated using a one-dimensional heat conduction model. The model predicts that the characteristic time is l/4D, where D is the thermal diffusivity of the strengthened glass substrate 100. Therefore, the diameter $d_j$ of the cooling jet may be qualitatively estimated by:

$$d_j \approx \frac{l^2}{4D} \cdot v, . \qquad \text{Eq. (4)}$$

The above equation illustrates the correlation between the cooling jet diameter $d_j$ and the depth of layer of the strengthened glass substrate 100. The cooling time should be increased correspondingly with an increase of the depth of layer.

The cooling spot 106 may be located proximate the trailing edge 122 of the elliptical beam spot 102. Referring to FIGS. 1-3, in one embodiment, the nozzle 160 is oriented such that the cooling spot 106 is positioned on the surface 130 of the strengthened glass substrate 100 on the line of desired separation 104 and within the elliptical beam spot 102. More specifically, the nozzle 160 of the illustrated embodiment is oriented such that the cooling spot 106 is located within the elliptical beam spot 102 between the center of the elliptical beam spot and the trailing edge 122 of the elliptical beam spot, such that the cooling spot 106 is spaced apart from the trailing edge by a distance z, as shown in FIG. 3. In this position the cooling spot 106 is at or near the maximum temperature on the surface of the strengthened glass substrate due to heating by the laser source. Accordingly, because the strengthened glass substrate 100 is quenched by the cooling jet at or near the maximum temperature, the resulting change in temperature ΔT (assuming the glass surface is heated to just below the strain temperature $T_g$) exceeds the change in temperature threshold $\Delta T_{TH}$, thereby facilitating the formation of the vent 109 which initially propagates from the initiation defect 112. Although the figures illustrate the cooling spot located within the elliptical beam spot and separated by a distance z, the cooling spot may be located directly on the trailing edge 122 or partially outside of the elliptical beam spot proximate the trailing edge, or lagging behind the elliptical beam spot by several millimeters. For example, for thinner strengthened glass substrates, the cooling spot may be positioned close toward or partially within the elliptical beam spot. For thicker strengthened glass substrates, the cooling spot may be positioned within the elliptical beam spot.

Referring to FIGS. 1 and 2, after the cooling jet 105 and cooling spot 106 are properly oriented with respect to the elliptical beam spot 102, the nozzle 160 and laser source 150 are advanced along the surface 130 of the strengthened glass substrate 100 on the line of desired separation 104 in the scribing direction 110 starting at the initiation defect 112. Alternatively, the strengthened glass substrate 100 may be translated. As the surface of the strengthened glass substrate 100 is heated to the maximum temperature and quenched at or near the maximum temperature, a scribe vent 109 is propagated from the initiation defect 112 toward the second edge 116 along the line of desired separation 104. The initiation defect 112 enables the formation of the scribe vent 109. The cooling jet/laser source and the strengthened glass substrate 100 are advanced relative to one another at a scribing speed υ which, in turn, is the speed of vent propagation along the line of desired separation 104. The scribing speed υ is generally selected such that overheating of the surface of the strengthened glass substrate is avoided while still allowing the surface of the strengthened glass substrate 100 to be heated to just below the strain temperature of the glass.

Figure 5A:
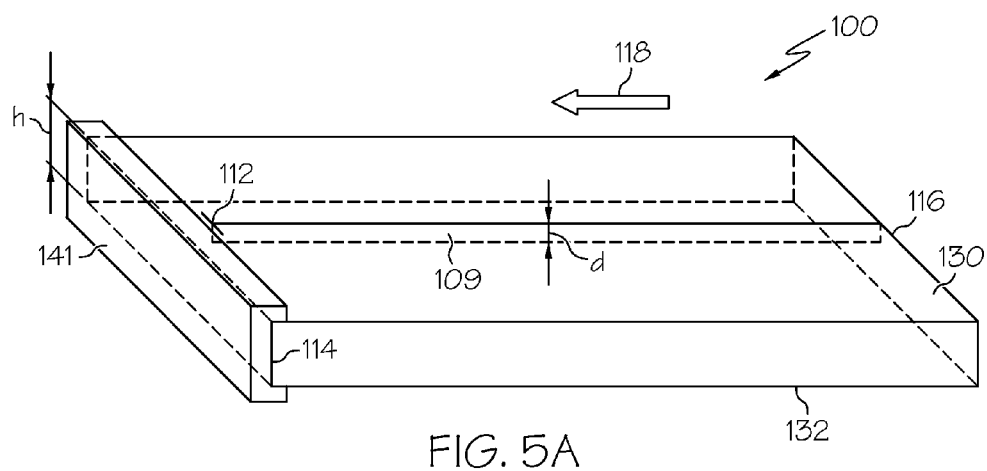
FIG. 5A schematically depicts a perspective view of a completed scribe vent according to at least one embodiment shown and described herein.
Figure 5B:
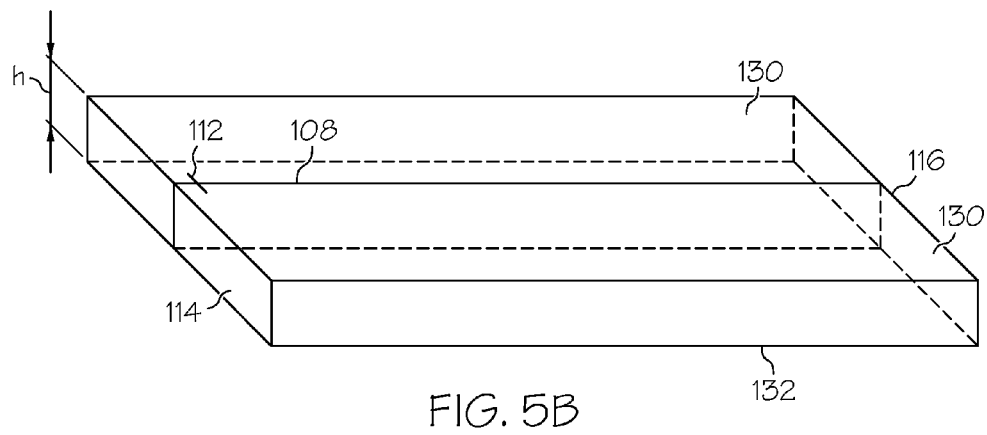
FIG. 5B schematically depicts a perspective view of a strengthened glass substrate that has been separated by self-separation according to at least one embodiment shown and described herein.

FIG. 5A illustrates a strengthened glass substrate 100 just as the elliptical beam spot 102 and cooling spot 106 have passed the second edge 116. As shown in FIG. 5A, a scribe line 109 extends from the initiation defect 112 to the second edge 116. A full-body crack is backward-propagated in direction 118 along the scribe line 109 that was generated during the scribing step as the elliptical beam spot 102 and the cooling spot 106 traverse the second edge 116 of the strengthened glass substrate 100. FIG. 5B illustrates the full-body crack 108 that separates the strengthened glass substrate 100. It is noted that although FIG. 5A illustrates a scribe vent 109 reaching the second edge 116, in practice the full-body crack 108 may start to backwards-propagate prior to the scribe vent 109 reaching the second edge 116.

The temperature imparted within the strengthened glass substrate 100 is higher at the second edge 116 (or any other edge) than any other position within the strengthened glass substrate 100 due to reduced glass volume of heat conduction at the edges. The higher temperature at the second edge 116 results in deeper vent depth as the elliptical beam spot 102 and cooling spot 106 traverse the second edge 116. In strengthened glass substrates, the laser generated vent rapidly develops into a full body crack 108 that develops at the second edge 116 as the vent depth of the scribe vent 109 deepens. If the depth of the laser-generated scribe vent is deep enough at the second edge 116, (e.g., around 15% of the thickness of the strengthened glass substrate 100 or higher), the full-body crack 108 will propagate backwards along the scribe vent or line 109 and completes self-separation without the step of applying mechanical force along the scribe line 109.

As an example and not a limitation, a 370 mm by 470 mm, a chemically strengthened aluminosilicate glass substrate sheet was separated using the above-described self-separation method along the width (370 mm) of the strengthened glass substrate. The strengthened glass substrate sheet had a thickness of 1.1 mm, a compressive stress within the compressive surface layers of about 625 MPa, a depth of layer of about 35 μm, and a tension stress within the inner tension layer of about 21 MPa. A $CO_2$ laser source with a repetition rate of about 20 kHz, a duty cycle of about 18%, and an output power of about 182 W was used to scribe the sheet. The laser beam was transformed into an elongated elliptical beam spot with a length of about 40 mm and a width of about 2 mm. A solid water cooling jet with a flow rate of about 16.5 sccm was used for quenching. A mechanical initiation defect was imparted onto the surface of the sheet near the first, initiation edge with a cone-shaped diamond tip with an angle of about 105 degrees. The initiation defect was about 3 mm long and oriented perpendicular to the line of desired separation. The first edge of the strengthened glass substrate sheet was shielded using a thin metal plate. As the laser beam and water jet traversed the sheet, a vent depth of about 160 μm was propagated along a line of desired separation. As the laser beam and water jet exited the second edge of the strengthened glass sheet, a full-body crack was created at the second edge and propagated backwards toward the initiation defect and first edge, thereby separating the strengthened glass substrate sheet into two pieces.

Figure 6:
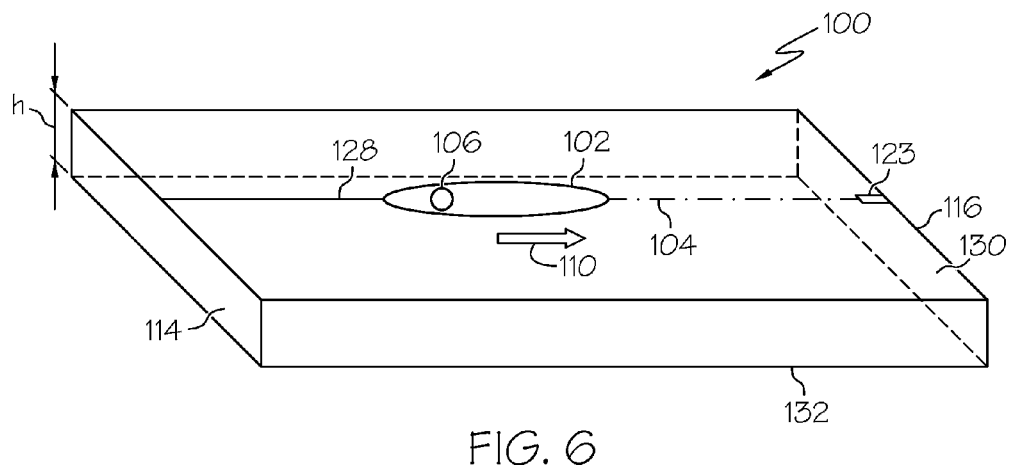
FIG. 6 schematically depicts a perspective view of an elliptical beam spot of a laser beam, a cooling spot of a cooling jet incident on a strengthened glass substrate, and an exit edge defect according to at least one embodiment shown and described herein.

Referring now to FIG. 6, another embodiment of separating a strengthened glass substrate 100 into one or more pieces is illustrated. In this embodiment, a full-body crack is generated and backward-propagated from the second edge 116 to the first edge 114 along a line of desired separation 104 without first forming a scribe vent or the use of a laser shield as described above. Generally, a residual stress field 128 is generated within the strengthened glass substrate 100 along a line of desired separation 104 by laser-induced thermal heating such that the full-body crack is guided by the residual stress field 128.

More specifically, an elliptical beam spot 102 may be generated on the surface 130 of the strengthened glass substrate 100. The elliptical beam spot 102 may be generated by a laser source 150 having the same properties as described above with reference to FIGS. 1-5B. In this embodiment, a cooling spot 106 may or may not be used to generate the residual stress field 128 along the line of desired separation 104. The residual stress field does not require the use of a cooling spot to quench the laser-induced heating. The cooling jet 105 may be selectively turned on and off during the translation of the elliptical beam spot 102. In one embodiment, the cooling jet 105 provides a cooling spot 106 to the surface 130 only when the elliptical beam spot 102 is near or on the exit defect 123. The quenching effect provided by the cooling spot 106 may provide an increased stress field near the exit defect 123 to further enable the full-body crack to develop. It is noted that the properties of the cooling spot 106 may also be the same as those described above.

Prior to translating the elliptical beam spot 102 and the optional cooling spot 106 across the surface 130, an exit defect 123 is formed on the exit edge (second edge 116) of the strengthened glass substrate 100. The exit defect 123 is preferably in contact with the second edge 116 and parallel to the line of desired separation 104, although the exit defect 123 may also have other orientations, such as perpendicular to the line of desired separation 104, for example. The exit defect 123 may be formed on the surface 130 by the use of a mechanical scribe or laser ablation, as described above regarding the formation of the initiation defect 112.

After applying the exit defect 123, the elliptical beam spot 102 and optional cooling spot 106 are translated across the surface 130 of the strengthened glass substrate 100 along the line of desired separation 104 starting from a first edge 114 toward the exit defect 123 and second edge 116. The laser source 150 and cooling jet 105 may be translated and/or the strengthened glass substrate 100 may be translated. For example, the strengthened glass substrate 100 may be mounted on a translation table that moves the strengthened glass substrate 100 with respect to the laser source 150 and the cooling jet 105. The translation speed of the elliptical beam spot 102 (and cooling spot 106, if utilized) with respect to the strengthened glass substrate 100 depends on the thickness, composition and properties (e.g., compressive stress, depth of layer, etc.) of the strengthened glass substrate 100, and whether or not a cooling spot 106 is used. Generally, the thinner the strengthened glass substrate, the faster the translation speed. In some embodiments, the translation speed may be between about 100 mm/s and about 300 mm/s.

Figure 7:
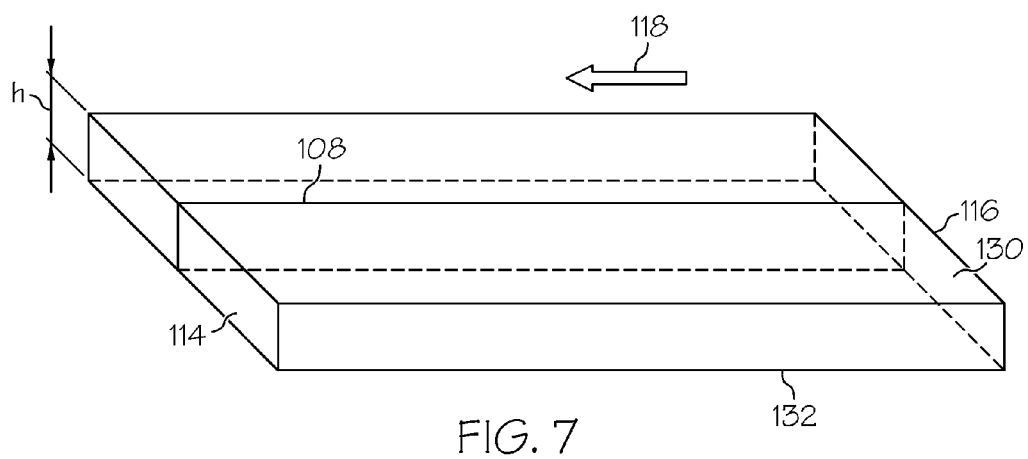
FIG. 7 schematically depicts a perspective view of a strengthened glass substrate that has been separated by controlled full-body separation according to at least one embodiment shown and described herein.

As the elliptical beam spot 102 is translated on the surface 130 of the strengthened glass substrate 100, the thermal energy provided by elliptical beam spot creates a residual stress field 128 along the scan path. The residual stress field 128 weakens the strengthened glass substrate 100 along the line of desired separation 104. Once the elliptical beam spot 102 and cooling spot 106, if utilized, reaches the exit defect 123, the thermal energy provided by the elliptical beam spot 102 causes a full-body crack 108 to open at the exit defect 123 (FIG. 7). Because the residual stress field weakens 128 strengthened glass substrate 100 along the line of desired separation 104, the full-body crack 108 is guided along the line of desired separation 104 by taking the path of least resistance. The full-body crack 108 separates the strengthened glass substrate 100 into two pieces. It is noted that the residual stress field decays over time, and the translation speed of the elliptical beam spot 102 or the strengthened glass substrate 100 should be such that the residual stress field is still present within the strengthened glass substrate 100 when the elliptical beam spot 102 reaches the exit defect 123 and second edge 116. As stated above, the cooling jet 105 may be turned on just as the elliptical beam spot 102 reaches the exit defect 123 to further enable the opening of the full-body crack 108.

As an example and not a limitation, a 370 mm by 470 mm, a chemically strengthened aluminosilicate glass substrate sheet was separated using the above-described self-separation method along the width (370 mm) of the strengthened glass substrate. The strengthened glass substrate sheet had a thickness of 1.1 mm, a compressive stress within the compressive surface layers of about 625 MPa, a depth of layer of about 35 µm, and a tension stress within the inner tension layer of about 21 MPa. A $CO_2$ laser source with a repetition rate of about 20 kHz, a duty cycle of about 18%, and an output power of about 182 W was used to scribe the sheet. The laser beam was transformed into an elongated elliptical beam spot with a length of about 40 mm and a width of about 2 mm. A solid water cooling jet with a flow rate of about 16.5 sccm was used for quenching, and operated in an on-state at all times during the separation process. A mechanical exit defect was imparted onto the surface of the sheet at the first, exit edge with a cone-shaped diamond tip with an angle of about 105 degrees. The initiation defect was oriented parallel to the line of desired separation. The strengthened glass substrate sheet was translated at a speed of about 165 mm/s. As the laser beam and water jet traversed the exit defect and second, exit edge, a full-body crack was created at the second edge and propagated backwards toward the first edge, thereby separating the strengthened glass substrate sheet into two pieces.

It should now be understood that the methods described herein may be used to separate strengthened glass substrates, such as strengthened glass substrates made from borosilicate glasses, as well as strengthened glass substrates formed from aluminosilicate glasses, including ion-exchange strengthened aluminosilicate glasses. Methods described herein enable sheets of strengthened glass substrates to be separated by backward-propagating a full-body crack from a second, exit edge to a first, initiation edge along a line of desired separation that was traversed with a laser beam. The laser beam weakens the strengthened glass substrate such that the full-body crack is guided along the line of desired separation. Embodiments may form a scribe line on the surface of the strengthened glass substrate using a laser shield, initiation defect, laser source and cooling jet such that the full-body crack backward-propagates along the scribe line. Embodiments may also form a residual stress field within the strengthened glass substrate using heat generated by a laser source, and propagate a full-body crack along the residual stress field from an exit defect positioned on the second, exit edge. The embodiments described herein enable controlled, full-body separation of strengthened glass substrates in one step without the need for the application of mechanical force, which may increase production speed and yield of articles separated from sheets of strengthened glass substrates, such as touch screen panels for consumer electronics, for example.

It will be apparent to those skilled in the art that various modifications and variations can be made to the embodiments described herein without departing from the spirit and scope of the claimed subject matter. Thus it is intended that the specification cover the modifications and variations of the various embodiments described herein, provided such modification and variations come within the scope of the appended claims and their equivalents.

What is claimed is:

1. A method of separating a strengthened glass substrate comprising a compressive surface layer and an inner tension layer, the method comprising:
   forming an initiation defect through the compressive surface layer to partially expose the inner tension layer, the initiation defect being offset from the first edge of the strengthened glass substrate and perpendicular to a scribing direction on the line of desired separation;
   translating a laser beam on a surface of the strengthened glass substrate along a line of desired separation from a first edge of the strengthened glass substrate toward a second edge of the strengthened glass substrate in a single pass of the laser beam such that a controlled full-body crack propagates from the second edge toward the first edge substantially along the line of desired separation as the laser beam traverses the second edge; and
   applying a cooling jet proximate the laser beam on the surface of the strengthened glass substrate, wherein:
   a scribe line is generated along the line of desired separation through the compressive surface layer, the scribe line being defined by a laser vent that penetrates partially into the inner tension layer; and
   the laser beam and the cooling jet are operated such that a depth of the laser vent proximate the second edge is sufficient to generate the controlled full-body crack at the second edge.

2. The method of claim 1 further comprising:
   preventing the laser beam from being incident on the surface of the strengthened glass substrate in a shielded region of the strengthened glass substrate located between the first edge and the initiation defect.

3. A method of self-separating a strengthened glass substrate comprising a compressive surface layer and an inner tension layer into two or more glass articles, the method comprising:
   forming an initiation defect through the compressive surface layer to partially expose the inner tension layer, the initiation defect being offset from a first edge of the strengthened glass substrate and perpendicular to a line of desired separation in a scribing direction;
   applying a laser shield to a shielded region of the strengthened glass substrate located between the first edge and the initiation defect;
   generating a scribe line along the line of desired separation through the compressive surface layer by translating a laser beam and a cooling jet on a surface of the strengthened glass substrate from the first edge toward a second edge of the strengthened glass substrate, wherein:

the scribe line is defined by a laser vent;

the laser shield prevents the laser beam from being incident on the surface of the strengthened glass substrate in the shielded region;

a full-body crack propagates from the second edge toward the first edge along the scribe line upon completion of the scribe line without an application of additional force as the laser beam traverses the second edge of the strengthened glass substrate; and the laser beam and the cooling jet are operated such that a depth of the laser vent proximate the second edge is sufficient to generate the full-body crack at the second edge.

4. The method of claim 3 wherein the strengthened glass substrate comprises an ion-exchanged strengthened glass substrate.

5. The method of claim 3 wherein the laser vent penetrates partially into the inner tension layer.

6. The method of claim 3 wherein the laser beam is configured to generate an elliptical beam spot having a major axis and a minor axis such that the major axis is aligned with the line of desired separation.

7. The method of claim 6 wherein the cooling jet is applied to the surface of the strengthened glass substrate within the elliptical beam spot at a trailing edge of the major axis.

8. The method of claim 3 wherein the laser beam is generated by a pulsed $CO_2$ laser.

9. The method of claim 3 wherein the depth of the laser vent proximate the second edge is greater than about 15% of a thickness of the strengthened glass substrate.

* * * * *